Figure 1:
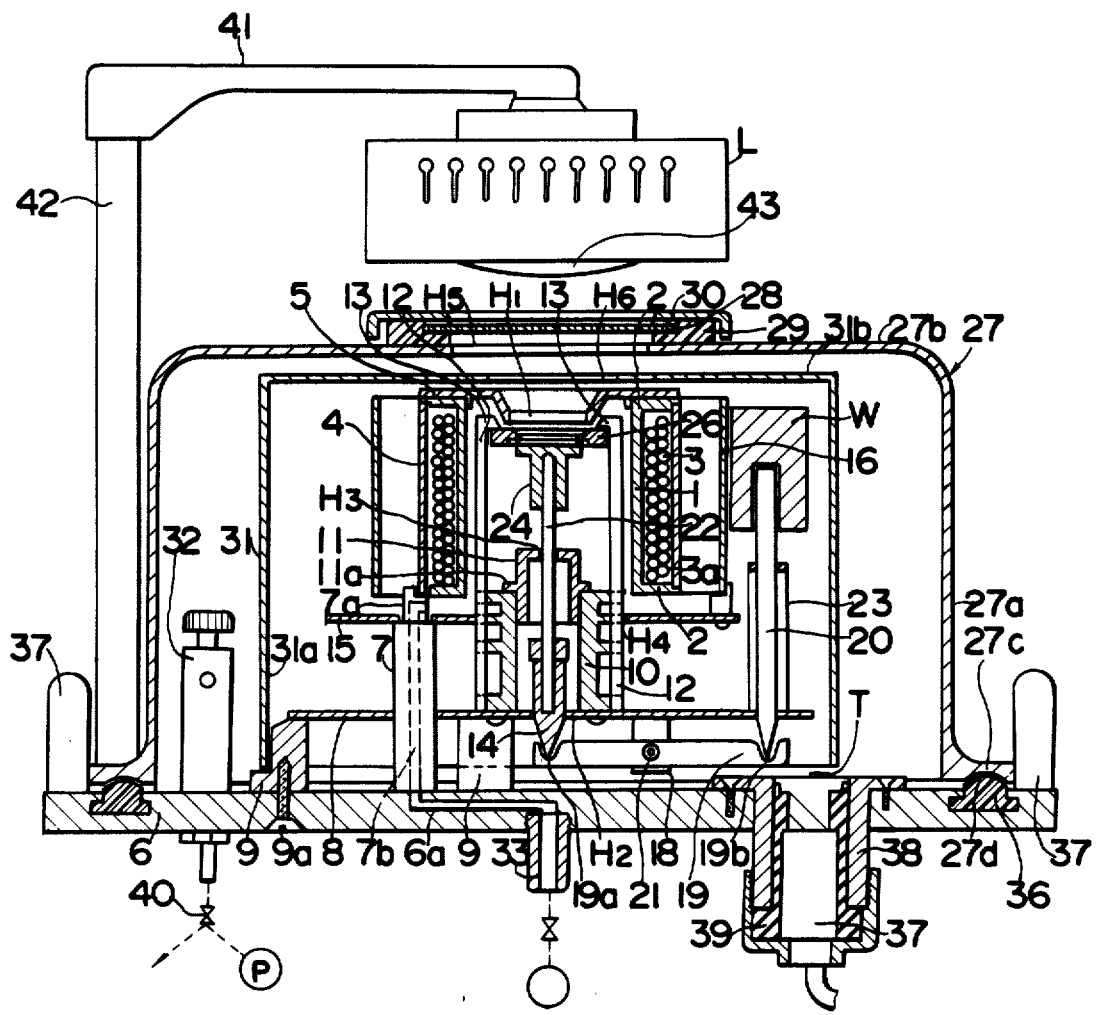

United States Patent [19]
Nunogaki

[11] 3,892,125
[45] July 1, 1975

[54] APPARATUS FOR USE IN MEASUREMENT OF THERMAL CONSTANT OF MATERIALS

[75] Inventor: Yoshiaki Nunogaki, Nagaokakyo, Japan

[73] Assignee: Sanki Engineering Ltd., Japan

[22] Filed: June 7, 1974

[21] Appl. No.: 477,468

[30] Foreign Application Priority Data
Aug. 10, 1973 Japan.............................. 48-94474

[52] U.S. Cl. ............................................... 73/15 A
[51] Int. Cl. .......................................... G01n 25/18
[58] Field of Search.................. 73/15 A, 15 R, 15.4

[56] References Cited
UNITED STATES PATENTS
| | | | |
|---|---|---|---|
| 3,069,893 | 12/1962 | Kerstetter | 73/15 A |
| 3,165,915 | 1/1965 | Parker et al. | 73/15 A |
| 3,396,584 | 8/1968 | Badin et al. | 73/15 R |

*Primary Examiner*—Richard C. Queisser
*Assistant Examiner*—Marcus S. Rasco
*Attorney, Agent, or Firm*—Craig & Antonelli

[57] ABSTRACT

An apparatus for use in measurement of the thermal constant of materials which essentially comprises a testpiece cell and a detector circuit. The testpiece cell includes a holder for holding a sample material to be tested. The sample material holder is designed such that the sample material placed on a receptacle in spaced relation to the body of the receptable is sandwitched between the receptacle and a pair of mutually 180° spaced finger members through a ring-shaped retainer. The pressure required to saidwitch the sample material depends on a weight acting on a spindle member supporting the receptacle. The testpiece cell can be used under either reduced or atmospheric pressure with the sample material in either of the heated, cooled and normal or ordinary state.

15 Claims, 5 Drawing Figures

APPARATUS FOR USE IN MEASUREMENT OF THERMAL CONSTANT OF MATERIALS

The present invention relates to an apparatus for use in measurement of the thermal constant such as diffusivity of materials.

Manufacturers and suppliers of such raw materials as metals, ceremics, synthetic or natural resins and others often feel importance and significance of knowing thermal properties or characteristics of some or all of the raw materials to which they are concerned. Even in research institutes and like establishments, particularly, where development of a new and unique material is aimed, knowing the thermal properties of the newly developed material is one of the most important factors which determine whether or not it has a practical utility and, if it has, what field of application it is suited for.

Some of the thermal properties of one material are generally represented by thermal constants including thermal diffusivity, specific heat and thermal conductivity which are all recognized interrelated with each other as represented by the following, theoretically established equations:

$$\alpha = (1.37 \times L^2) / (\pi^2 \times t) \quad (1)$$

$$C = Q / (Tm \times d \times L) \quad (2)$$

$$K = \alpha \times C \times d \quad (3)$$

wherein:
- $\alpha$: Thermal diffusivity in terms of cm$^2$/sec. of a sample material to be tested,
- $L$: Thickness of the sample material,
- $C$: Specific heat of the sample material in terms of cal/g.°C.
- $Q$: Quantity of heat energy, in terms of cal/cm$^2$, absorbed in one surface of the sample material which faces a source of heat energy,
- $Tm$: Maximum temperature rise attainable by the sample material relative to a given quantity of heat energy applied to the surface of the sample material,
- $t$: Time, in terms of second, required for the initial temperature of the sample material to increase a value equal to half the maximum temperature rise Tm,
- $d$: Density of the sample material in terms of g/cm$^3$, and
- $K$: Thermal conductivity of the sample material in terms of cal/cm.sec.°C.

From the foregoing, it can be said that if the respective value of $t$, Tm and Q are known while the values of L and $d$ can be easily calculated with no substantial efforts, the thermal diffusivity $\alpha$ and the specific heat C, both of the sample material to be tested, can be easily found, which in turn provide an instrument for determining the thermal conductivity K of the same sample material. So far as the thermal diffusivity is concerned, only the time t is an unknown factor and determination of the value of t is sufficient to find it.

The present invention also pertains to a test-piece cell for use in measurement of the thermal diffusivity, for holding a sample material therein under a controlled condition in such a manner as to minimize energy losses through conduction, convection and/or radiation.

The testpiece cell itself is not a new development and, in fact, it has been largely employed in measurement of the thermal diffusivity. However, the testpiece cell heretofore available is hard to operate and requires laborious and careful handling procedures in installing a sample material to be tested in a predetermined manner within the cell. For example, the conventional cell includes a sample material support of a type having a separable ring-shaped holder. The holder comprises a ring-shaped receptacle and a ring-shaped lid adapted to be threadably engaged in said receptacle with a sample material or testpiece being hold between said receptacle of said lid. The separable holder thus mounted with the testpiece is subsequently placed on a stationary bench within the cell. In this case, in addition to the laborious and careful handling procedure, since the peripheral edge of the testpiece to be tested is firmly clamped between the receptacle and the lid thereby preventing the testpiece to warp or deform upon receipt of heat of relatively high temperature during an actual measurement, a uniform transient characteristic of heat energy from one surface of the testpiece to the opposite surface thereof cannot be available which more or less adversely affects a precise measurement.

The use of the testpiece holder of the type referred to above has another disadvantage in that, when, for example, two or more sample materials of different composition, but falling within the same category or class, are to be tested for comparative analysis, these sample materials cannot be held in position under the same condition within the cell.

Accordingly, an essential object of the present invention is to provide an improved apparatus for use in measurement of the thermal constant such as diffusivity of materials, which substantially eliminate the disadvantages and inconveniences inherent in the conventional measurement of the thermal diffusivity, thus enabling a non-expert operator or user to operate the apparatus.

Another object of the present invention is to provide an improved apparatus of the type referred to above, which includes a testpiece cell designed such as to hold a sample material to be tested in position without substantially being influenced by the temperature of mechanical components around the sample material, the flow or convection of a gaseous body and/or the unnecessary radiation of heat.

A further object of the present invention is to provide an improved apparatus of the type referred to above, wherein measurement of the sample material can be carried out under any selected one of substantially vacuum and atmospheric conditions and in any selected one of heated, cooled and normal or ordinary states, so that the Curie temperature and the temperature dependence of thermal diffusivity of the same sample material can be determined.

A still further object of the present invention is to provide an improved apparatus of the type referred to above, wherein relatively movable interengagement of one mechanical component with respect to another adjacent thereto is made by a point-contact engagement without substantially employing any pin member or like connecting members, thus substantially eliminating the necessity of oiling.

According to the present invention, the apparatus herein disclosed and claimed is effectively used in measurement of the thermal diffusivity of any of various materials such as metals, ceramics, synthetic and natural resins, woven or non-woven cloths, glass and other numerous items. Measurement of the thermal diffusivity provides the basis for calculation or determination of the specific heat and thermal conductivity of the same sample material.

By way of example, for comparative analysis of two or more materials of different composition, but deemed falling within the same category or class, or of different quality, in terms of the thermal constants, each of respective samples or testpieces of these materials should be measured under the same condition, i.e., at the same temperature under the same pressure and with the same input of heat energy so that the individual thermal diffusivities of these materials at a given temperature can be available.

On the other hand, in case where the temperature dependence of thermal diffusivity of a particular material is to be analysed, thermal diffusivities of the same material at different temperatures should be determined and subsequently plotted in a graph wherein the axes of abscissas and ordinates respectively represent variation of temperature and variation of thermal diffusivity. This can be easily achieved by heating or cooling the particular sample material to different temperatures each time a series of measurement at the individual temperatures is to be carried out.

The apparatus so far disclosed in accordance with the present invention does not give a readily available or readable information of the thermal diffusivity of a material tested. However, what is available from the apparatus of the present invention is a temperature gradient inside of the material tested, i.e., variation of temperature rise of the material in relation to the time elapsed, which may be recorded on a recording medium and/or visually displayed through an oscilloscope or cathode ray tube. The time $t$ which is an unknown factor in the equation (1) can be readily available from the temperature gradient recorded or displayed.

Figure 2:
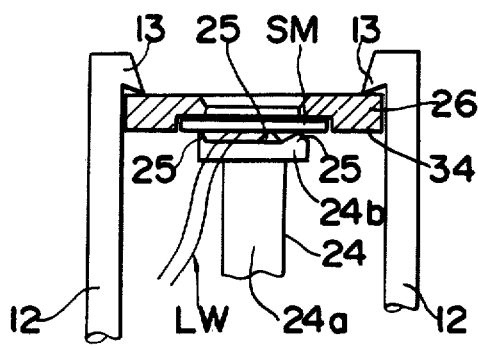
Figure 3:
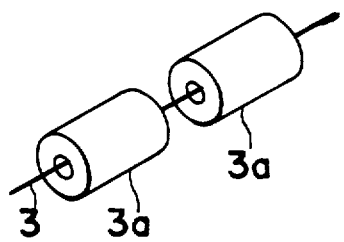
Figure 4:
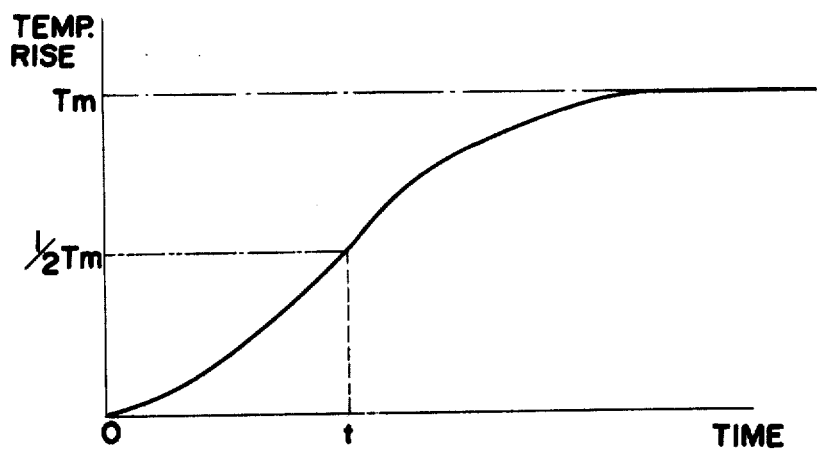
Figure 5:
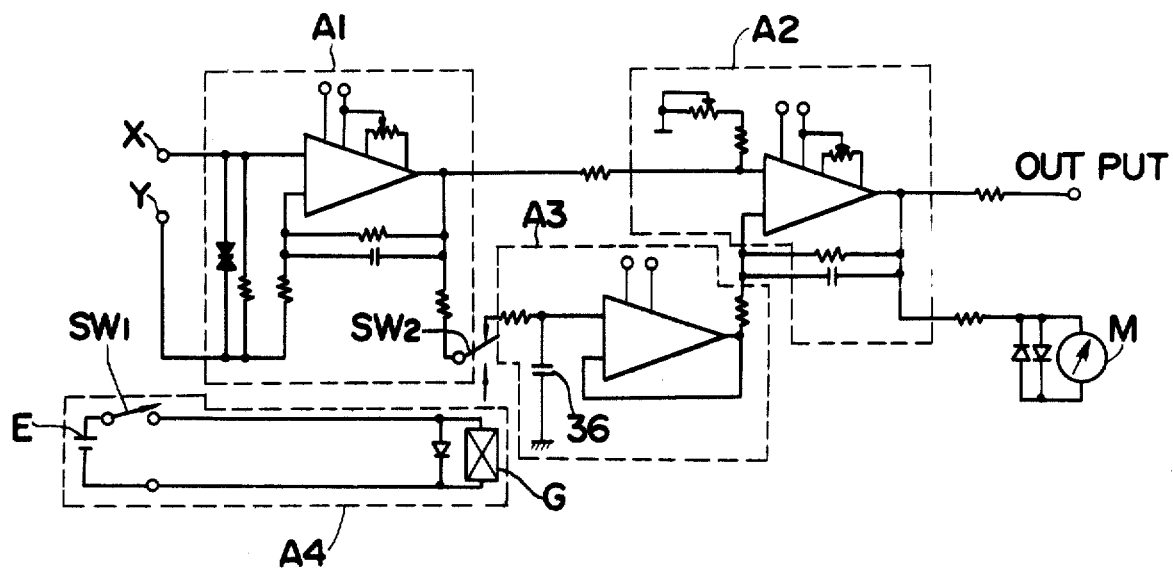

These and other objects and features of the present invention will become apparent from the following description taken in conjunction with a preferred embodiment thereof with reference to the accompanying drawings, in which:

FIG. 1 is a longitudinal sectional view of a testpiece cell constructed in accordance with the present invention, FIG. 2 is a longitudinal sectional view, on an enlarged scale, of an essential portion of the testpiece cell, showing a manner of supporting a sample material, FIG. 3 is a schematic perspective view of a portion of a heating wire employed in the testpiece cell, FIG. 4 is an illustrative graph showing the temperature gradient recorded or displayed with the output signal from a circuit shown in FIG. 5, and FIG. 5 is a diagram showing an electrical circuit used to generate a signal indicative of temperature rise of a sample material.

Referring first to FIGS. 1 to 3, the testpiece cell according to the present invention comprises a substantially bell-shaped enclosure, generally indicated by 27, formed by a cylindrical hollow body 27a, one end of which is closed by a ceiling 27b having a central opening $H_3$ and the other end of which is formed with a radially outwardly extending mounting flange 27c. The opening $H_3$ serves as an entrance for a flash beam of light emitted from a lamp house L as will be described later and closed by a transparent shield 28 preferably made of glass material sufficient to withstand to the elevated temperature and also to the negative pressure to be created within the cell as will be described later. The transparent shield 28 may be held in position in any suitable manner in alignment with the opening $H_3$ and, in the embodiment as shown, a mounting ring 30 is employed while the peripheral portion of the transparent shield 28 that is sandwiched between the mounting ring 30 and the ceiling 27b of the enclosure 27 is mounted with a ring-shaped sealing member 29.

Positioned below the enclosure 27 in contact with the mounting flange 27c is a base plate 6 which may be a part of bench or of a top plate of an instrument housing structure (not shown). The base plate 6 is embedded on its upper surface with a ring-shaped sealing member 36 which projects outwards from the upper surface of the base plate 6 for tight engagement into the mating annular groove 27d formed in the mounting flange 27c of the enclosure 27.

In the arrangement so far described, a closed cell chamber can be defined if the enclosure 27 is placed on the base plate 6 with the groove 27d receiving therein the sealing member 36. Alternatively, without employing the sealing member 36 and the groove 27d, mounting of the enclosure 27 on the base plate 6 may be made by the use of a ring-shaped rubber matting to be held between the flange 27c and the base plate 6 and a suitable number of fastening members such as bolts or screws. This alternative method of mounting is particularly advantageous where the closed cell chamber is held pressurized.

For avoiding a misalignment of the enclosure 27 relative to the central area on the base plate 6 defined by the sealing member 36, at least three or more centering pins 37 are provided on the upper surface of the base plate 6 in equally spaced relation to the sealing member 36 and also to each other.

Within the closed cell chamber defined above, a disc table 8 is mounted, either rigidly or removably, in equally spaced relation to the base plate 6 on a plurality of foundations, only two of which are shown by 9 and which are rigidly mounted on the base plate 6 by the use of setting screws 9a. This disc table 8 is formed with an opening $H_2$ in alignment with the opening $H_3$ in the enclosure 27 and carries a substantially finned, cylindrical stem 10 upwardly extending therefrom and rigidly mounted thereon in alignment with the opening $H_2$.

The stem 10 upwardly extending from the disc table 8 further extends through an opening $H_4$ formed in a partition plate 15 which is, preferably removably, supported above and in parallel relation to the disc table 8 by means of at least three or more support pillars 7 that are rigidly extending from the base plate 6 through the disc table 8. If the disc table 8 is sufficiently rigid enough to support the composite weight of various components located thereabove, the pillars 7 may extend from said disc table 8. As clearly shown, each of the pillars 7 has one end rigidly connected to the base plate 6 and the other end reduced in diameter as at 7a and extending through the partition plate 15 so as to terminate at the level slightly higher than the plane of said plate 15, by a reason as will become clear later.

A bearing sleeve 11 of an outer diameter substantially equal to the inner diameter of the stem 10 and formed on its outer periphery with a land 11a substantially intermediate of the length thereof is inserted into the bore of the stem 10 with the land 11a resting on the annular upper end of said stem 10. This bearing sleeve 11 has an upper end substantially reduced in inner diameter to provide a bearing hole $H_3$ of a diameter substantially equal to the diameter of a spindle 22 which will now be described.

The spindle 22 forms a part of a sample material holder of a construction as will be described later and slidably extends through the bearing hole $H_3$ in the bearing sleeve 11 which may be integrally formed with said stem 10. This spindle 22 has a lower end loosely extending through the stem 10 and rigidly inserted into a socket 14 having a free end substantially roof-shaped. A seesaw lever 19 pivotally secured to a bracket 18 extending from either the disc table 8 or the base plate 6 extends between the base plate 6 and the disc table 8 at right angles to the direction of development of a substantial ridge of the roof-shaped end of the socket 14 and has both end portions inwardly rounded as at 19a and 19b respectively. Extending upwardly from the rounded portion 19b in parallel to the spindle 22 while the other rounded portion 19a receives therein the roof-shaped end of the socket 14 is a support rod 20 having a lower end machined to represent the shape similar to that end of the socket 14 and the other end adapted to receive a weight W, a substantially intermediate portion of which extends through the disc table 8 and then a support structure 23. It should be noted that the socket 14 is not always necessary and may, therefore, be omitted if the lower end of the spindle 22 is machined to represent the shape similar to the roof-shaped end of the socket 14.

The sample material holder comprises at least two or more holding arms 12 secured, for example, to the stem 10 and spaced 180° with respect to each other about the longitudinal axis of said stem 10, if the number of said arms 12 is two as shown. As best shown in FIG. 2, end portions of these arms 12 remote from the stem 10 are shaped to provide substantially tapered fingers 13, respectively, which are downwardly oriented and face with respect to each other.

The sample material holder further comprises a receptacle 24 of substantially T-shape in section having a mounting portion 24a either rigidly or removably mounted on the spindle 22 and a support 24b for a sample material SM to be tested. The support 24b has, as best shown in FIG. 2, at least three, equally spaced and upwardly extending nails 25, the respective tips of these nails 25 being adapted to support a sample material SM, which is not shown in FIG. 1, in spaced relation to the plane of the upper surface of the support 24b of the receptacle 24. This design is particularly advantageous in that transmission of the temperature of the receptacle 24 to the sample material SM can be minimized. For more minimizing this temperature transmission, the receptacle 24 and also a retainer 26 as will be described later are preferably made of ceramic material having a relatively low thermal conductivity.

The retainer 26 is ring-shaped and is of an outer diameter substantially equal to or slightly smaller than the inside span between the arms 12. The smallest diameter of the central opening of this retainer 26 is slightly smaller than the diameter of the support 24b so that, as best shown in FIG. 2, the peripheral portion of the sample material SM of a predetermined size or diameter can be sandwitched between the retainer 26 and the tips of the nails 25 on the support 24b of the receptacle 24. In practice, for facilitating mounting of the sample material SM and centering it relative to either the support 24b or the retainer 26, the retainer 26 is integrally formed with a cylindrical wall portion 34 having an inner diameter greater than the central opening of said retainer 26, but substantially equal to or slightly greater than the predetermined diameter of the sample material SM, so that the latter can be replaceably accommodated within a space defined by the retainer 26 and the cylindrical wall portion 34. The outer diameter of said wall portion 34 may be equal to or smaller than the outer diameter of the retainer 26.

In the arrangement so far described, at the time of completion of mounting of the sample material which is carried out in a manner as will be described later, the receptacle 24 and the retainer 26 with the sample material SM held therebetween tend to upwardly move together with the spindle 22 by the effect of the weight W which is transmitted thereto through the seesaw lever 19 pivoting about the pivot as at 21. However, the upward movement of these elements 24 and 26 is restricted by the contact of the retainer 26 to the mutually 180° spaced fingers 13 in such a manner as clearly shown in FIG. 2.

In view of the above, preferably, the weight W is selected such as to permit the sample material SM to be saidwitched between the retainer 26 and the nails 25 under a pressure sufficient to retain the sample material without being warped or deformed upon receipt of hear or upon being heated during an actual measurement. In other words, the weight W may vary depending upon the thickness of the sample material to be actually tested and/or the type of the same while the size thereof remains the same.

Mounting of the sample material SM in position within the closed cell chamber can be easily and readily carried out. What is required is to downwardly push the receptacle and then to insert the retainer 26 previously mounted with the sample material SM and place it on the receptacle support 24b. At this time, the weight W may temporarily be removed and mounted on the support rod 20 after the retainer 26 together with the sample material SM has been placed in position above the support 24b.

It should be noted that, prior to the mounting of the sample material SM, a pair of lead-in wires LW (FIG. 2) should be secured to one surface of the sample material SM, which is expected to face the receptacle 24, by any suitable method, for example, by means of resistance spot welding or silver soldering if the material is metal or by the use of adhesive paste if the material SM is other than metals. The lead-in wires LW are in turn connected to terminals T leading to a thermo couple (not shown). The lead-in wires LW are, although not shown, insulated from each other and from the various metallic components within the cell by means of insulating elements known to those skilled in the art. By way of example, insulating pieces such as shown in FIG. 3 may be employed.

Preferably, the terminals T for connection with the lead-in wires LW and also for connection with a power supply line (not shown) leading from a heating unit as will be described later are collectively carried by a single terminal support 37 which is housed through a sealing material 39 within a connector assembly 38 rigidly extending through the base plate 6 as shown.

The construction so far described can be satisfactorily used in measurement of the sample material SM at ambient or normal temperature. However, in order to minimize transmission of temperature from the outside of the closed cell chamber to the interior thereof through the enclosure 27, which may affect the initial temperature of the sample material SM, and also to minimize convection of a gaseous body within the closed cell chamber, the use of an inner enclosure or shell 31 is recommended. The inner enclosure or shell 31 may be similar in shape to the enclosure 27, but of a different, i.e., smaller size and substantially composed of a cylindrical wall 31a, having one open end adapted to be removably mounted on the foundations 9 as shown in spaced relation to the base plate and the other open end closed by a top plate 31b having a central opening formed therein as at $H_6$ in alignment with the openings $H_2$ and $H_5$ and also with the longitudinal axis of the stem 10. The end of the cylindrical wall 31a opposed to the top plate 31b may not be spaced from the base plate 6, but in contact therewith.

In order to enable the apparatus to be used in measurement of thermal diffusivity of a particular material at different initial temperatures, a heating unit is provided, which essentially comprises a coiled heating wire 3 such as nichrome wire. This heating wire 3 loosely mounted with a plurality of insulating pieces 3a made of ceramic material is wound in a number of convolution around a cylindrical body 1, both ends of which are integrally formed with radially outwardly extending flanges 2. The inner diameter of the cylindrical body 1 should be sufficiently enough to loosely accommodate the outside span between the arms 12. A protective panel 4 surrounds the heating aire 3, coiled around the cylindrical body 1, with both edges in contact with the flanges 2, both ends of said panel 4 being suitably joined to each other.

Mounted above the heating unit and, more particularly, on one of the flanges 2 adjacent the opening $H_5$ or $H_6$ is a cover 5 having a downwardly oriented, funnel-shaped opening $H_1$ aligned with the opening $H_5$ or $H_6$, which is used to confine heat energy produced by the heating wire, with in the hollow of the cylindrical body 1.

The heating unit of the above construction is removably placed in position with the opposite flange 2a remote from the opening $H_5$ or $H_6$ resting on the reduced diameter portions 7a of the pillars 7.

Surrounding the heating unit is a cylindrical partition 16 mounted around said heating unit and above the partition plate 15 by means of a suitable number of spacers (not shown) which may upwardly and rigidly extend from either the partition plate 15 or the disc table 8. It will be seen that the more the partitioning members such as indicated by 15 and 16, the greater the possibility of maintaining the sample material SM at a given temperature. This is ture whenever the sample material SM is heated or cooled so as to change the initial temperature thereof which is attained at the time of application of external heat energy from the lamp house L.

For cooling the closed cell chamber and, hence, the sample material, a liquified inert gas such as nitrogen may be employed. This liquified gas is adapted to flow into the closed cell chamber through the coupler 33, passages 6a formed in the base plate 6 and passages 7b formed in the pillars 7. It should be noted that, while one end of each of the passages 7a is communicated to the associated passage 6a, the other end thereof is preferably opened towards a local area around the spindle 22 and adjacent the receptacle 22 so that the material SM can be readily cooled.

An exhaust valve is provided as at 32, having one end open within the closed cell chamber and the other end communicated both to the atmosphere and to a source of vacuum, i.e., suction pump P through a switching valve 40. It will be seen that when liquified gas is to be supplied into the closed cell chamber, the switching valve 40 is adjusted such as to communicate the closed cell chamber to the atmosphere and when the closed cell chamber is to be held under substantial vacuum, the switching valve 40 is adjusted such as to communicate the closed cell chamber to the suction pump P.

The lamp house L is suspended from an arm 41 that is pivotally mounted on a post 42 rigidly extending from the base plate. Pivotal movement of the arm 41 about the post 42 should be restricted by a stopper or detent (not shown) at the time the lamp house L is aligned with the entrance 28 through which a beam of light is applied therefrom to the sample material SM held in position by the holder.

A source of light (not shown, but carried by the lamp house L) may be a laser, xenon filled lamp, halide filled lamp or any other suitable light emitters which emit a beam of light of relatively high temperature. On the path of travel of the light beam towards the sample material within the closed cell chamber, the lamp house L may have a condensing lens 43 for condensing the light beam on one of the surfaces of the sample material that faces towards the lamp house L by the reason known to those skilled in the art. It should be noted that the positions of the condensing lens 43 and the transparent shield 28 may be reversed with each other.

From the foregoing description of the construction of the testpiece cell according to the present invention, it has now become clear that, when a beam of light of a relatively high temperature is instantaneously applied to the sample material SM, a heat energy of the light beam is first absorbed in the front surface of the sample material SM and then diffused in the sample material towards the opposite rear surface thereof, thus increasing the temperature of the sample material from its initial temperature to a definite value. A temperature detector including the thermo couple connected to the rear surface of the sample material senses variation in temperature at the rear surface thereof which takes place after the application of heat energy to the front surface thereof. The temperature detector may be connected to either or both of a transient recorder and an oscilloscope through which a graph such as shown in FIG. 4 can be obtained.

From the graph shown in FIG. 4, assuming that the initial temperature of a sample of a certain metallic material of a given thickness has increased a value represented by the maximum temperature rise Tm relative to a given quantity of heat energy applied from the lamp house L, the time $t$ required for the temperature rise to attain a value ½Tm equal to half the maximum temperature rise Tm can be readily found. Therefore, from the equations (1), (2) and (3), the thermal diffusivity, specific heat and thermal conductivity can be calculated.

In practice, for facilitating absorption of heat energy applied, the front surface of the sample material is preferably applied with a carbon black painting. The use of the carbon black painting is advantageous in another respect. In case where a plurality of samples of different materials are to be tested with the same apparatus, the application of the carbon black painting on the front surface of each of these samples substantially fixes the quantity of heat energy absorbed in the front surface thereof. However, the carbon black painting to be applied should be so thin that various thermal factors thereof can be negligible.

Moreover, in practice, an electric power supply circuit associated with the heating unit, although not shown, should be understood as including a temperature control such as an adjustable thermostat to thereby enable the sample material SM to be heated up to a predetermined temperature which varies depending on the setting of the thermostat.

The temperature detector is illustrated in FIG. 5, but the thermo couple is still not shown. However, a pair of terminals X and Y are connected to the lead-in wires LW (FIG. 2) through the thermo couple.

Referring now to FIG. 5, the circuit comprises a first differential amplifier $A_1$, a second differential amplifier $A_2$ and a non-inverting amplifier $A_3$. The terminals X and Y form an input of the circuit shown, the output of which is adapted to be fed to a recording instrument (not shown), for example, the transient recorder and/or oscilloscope.

A circuit $A_1$ forms a power circuit and includes a series circuit composed of a power source E, a switch $SW_1$ and a solenoid coil G. When the switch $SW_1$ is closed the solenoid coil G can be energized. The solenoid coil G is so associated with a normally closed switch $SW_2$ that when the solenoid coil G is energized, the switch $SW_2$ is turned off.

Assuming that the sample material SM is placed in position within the cell and the switch $SW_1$ is in the opened condition at this time and, therefore the switch $SW_2$ is in the closed condition, output voltage of the thermo couple which has been amplified by the first differential amplifier $A_1$ is fed in part to one of inputs of the second differential amplifier $A_2$ through the non-inverting amplifier $A_3$ and in part to the other output of the second differential amplifier $A_2$. This is a condition established prior to application of heat energy to the sample material SM and, therefore, even if the sample material is being heated, variation of the output voltage from the first differential amplifier $A_1$ is so slow that the level of output signal from the second differential amplifier does not substantially vary.

The switch $SW_1$ is, although not shown, associated with the light emitter within the lamp house L through a suitable circuit designed such as to energize the light emitter for a predetermined period of time upon closure of the switch $SW_1$, thereby applying heat energy to the sample material SM.

Assuming now that the sample material SM has been heated to a predetermined initial temperature and the switch $SW_1$ is subsequently closed, the light emitter within the lamp house L is energized to apply the heat energy to the sample material and at the same time, the solenoid coil G is energized to turn the switch $SW_2$ off. Upon receipt of the heat energy thus applied, the initial temperature of the sample material SM gradually increases and an output signal indicative of this temperature rise which emerges from the first differential amplifier $A_1$ is directly fed to the second differential amplifier $A_2$ without passing through the non-inverting amplifier $A_3$. This is because the switch $SW_2$ is in the opened condition at this time and an output voltage that has passed through the switch $SW_2$ prior to closure of the switch $SW_1$ is stored on a capacitor 36 and, accordingly, no variation takes place in the output of the non-inverting amplifier $A_3$.

As a result thereof, only a voltage corresponding to temperature rise of the sample material SM that takes place due to instantaneous application of the heat energy can be, after having been amplified by the second differential amplifier $A_2$, to the recording instrument. From the foregoing, it has now become clear that, by the output signal from the circuit of FIG. 5, a temperature transient such as shown in FIG. 4 can be obtained.

Although the present invention has been fully described by way of example with reference to the accompanying drawings, it should be noted that various changes and modifications are apparent to those skilled in the art. By way of example, the lamp house may incorporate an air blower, situated within or outside the lamp house, for supplying a cooling air to the light emitter. In addition, in order to prevent the transparent shield 28 from being dim with steam created by the temperature differential between the inside and outside of the closed cell chamber, means may be employed for applying a hot air towards the transparent shield 28. In addition, it should be noted that the retainer 26 may not be always necessary and may be omitted if the sample material to be tested has a sufficient mechanical strength to an extent that it will not warp nor deform upon receipt of a predetermined quantity of heat energy applied.

Therefore, unless otherwise these changes and modifications depart from the true scope of the present invention, they should be construed as included within such scope of the present invention.

What I claim is:

1. An apparatus useable in measurement of a temperature transient characteristic of any of such materials as metals, alloys, synthetic and natural resins, ceramics and others, which comprises a source of light which emits a beam of light of relatively high temperature for a predetermined period of time; a testpiece cell positioned below said light source in alignment with a path of travel of said light beam, said cell including a base plate and an enclosure for defining a closed cell chamber, said enclosure having a light entrance opening closed by a transparent shield, said cell further including a support table rigidly supported above said base plate within said closed cell chamber, a first support rod having a lower end situated within a space between said support table and said base plate and substantially vertically extending in alignment with said light entrance opening, means for supporting said first support rod for up and down movement, a lever means pivotally supported within said space between said support table and said base plate and having one end pivotally connected to the lower end of said support rod, the other end of which is adapted to receive an external force, a receptacle adapted to support a sample of the material of a predetermined size thereon and carried by said first support rod at the other, upper end thereof, at least one pair of clamp finger members 180° spaced from each other about the lingitudinal axis of said support rod and being cooperative with said receptacle for, so long as the external force is continuously applied to that end of said lever means, clamping the sample material between said receptacle and said finger means under pressure determined by said external force while said support rod is upwardly biased, said sample material on said receptacle being in alignment with the path of travel of said light beam; and means for detecting variation of the initial temperature of said sample material which is caused by application of the light beam to said sample material held in position by said finger members and said receptacle.

2. An apparatus as claimed in claim 1, wherein said receptacle is composed of a cylindrical body adapted to be removably mounted on said first support rod and a support having one end integrally formed with said cylindrical body and the other end formed with at least three upwardly tapered members, said sample material when mounted on said receptacle resting on the respective tips of said upwardly tapered members.

3. An apparatus as claimed in claim 2, further comprising a retainer ring removably used for avoiding the sample material from being warped or deformed which may occur if said sample material receives a heat energy, said retainer ring being situated between said finger members and said receptacle with said sample material sandwitched between it and the respective tips of said upwardly tapered members on said support of said receptacle so long as the external force is applied to that end of said support rod.

4. An apparatus as claimed in claim 2, further comprising a vertically extending second support rod having a lower end situated within the space between said support table and said base plate and pivotally connected to the other end of said lower means, the other end of which is adapted to receive a weight.

5. An apparatus as claimed in claim 1, further comprising passage means for communicating the closed cell chamber to a source of cooling medium for, when said cooling medium is supplied into said closed cell chamber, cooling the sample material and exhaust passage means and a valve means, said exhaust passage means being communicated between said closed cell chamber and said valve means, said valve means being in turn communicated with the atmosphere and a source of vacuum, said valve means being adjustable to permit the closed cell chamber to communicate with the atmosphere when said cooling medium is supplied into said closed cell chamber and to permit the closed cell chamber to communicate with the vacuum source when the closed cell chamber is to be held under substantial vacuum.

6. An apparatus as claimed in claim 1, further comprising a heating device of substantially cylindrical shape adapted to be removably supported above the support table in alignment with the longitudinal axis of the first support rod so as to encircle said receptacle.

7. An apparatus as claimed in claim 6, further comprising at least one partition plate supported in position between said heating device and said support table.

8. An apparatus as claimed in claim 7, further comprising at least one cylindrical partition panel supported above said partition plate and encircling said heating device.

9. An apparatus useable in measurement of a temperature transient characteristic of any of such materials as metals, alloys, synthetic and natural resins, ceramics and others, which comprises a source of light which emits a beam of light of relatively high temperature for a predetermined period of time; a testpiece cell positioned below said light source in alignment with a path of travel of said light beam, said cell including a base plate and an enclosure for defining a closed cell chamber, said enclosure having a light entrance opening closed by a transparent shield, said cell further including a support table rigidly supported above said base plate within said closed cell chamber, a first support rod having a lower end situated within a space between said support table and said base plate and substantially vertically extending in alignment with said light entrance opening, a second support rod having a lower end situated within said space and vertically extending in substantially parallel to said first support rod, the other, upper end of said second support rod being adapted to receive a weight, a lever means pivotally supported within said space between said support table and said base plate, both end portions of which pivotally support the lower ends of said first and second support rods, respectively, a receptacle adapted to support a sample of the material of a predetermined size thereon and removably carried by said first support rod at the other, upper end thereof, separate means for supporting said first and second support rods for movement in a vertical direction, at least one pair of clamping finger members 180° spaced from each other about the lingitudinal axis of said first support rod and being cooperative with said receptacle for, so long as a downwardly acting force of said weight is continuously applied to said lever means and then to said first support rod through said lever means thereby upwardly shifting said first support rod, clamping the sample material between said receptacle and said finger members under pressure determined by said weight, said sample material being at this time in alignment with the path of travel of said light beam, at least one partition plate removably supported above said support table and below said receptacle, a heating device of substantially cylindrical shape for heating the sample material to change the initial temperature of said sample material and adapted to be removably supported above said partition place in alignment with the longitudinal axis of the first support rod so as to encircle said receptacle; and means for detecting variation of the initial temperature of said sample material which is caused by the application of the light beam to said sample material held in position by said finger members and said receptacle.

10. An apparatus as claimed in claim 9, wherein said receptacle comprises a cylindrical body having one end adapted to be removably mounted on said first support rod and a support having one end face integrally formed with the other end of said cylindrical body, the other end face of said support facing towards the light source and formed with at least three equally spaced upwardly tapered members, said sample material when held in position on said receptacle, resting on the respective tips of said upwardly tapered members.

11. An apparatus as claimed in claim 9, wherein said receptacle is made of ceramic material.

12. An apparatus as claimed in claim 9, further comprising a retainer ring removably used for avoiding the sample material from being warped or deformed which may occur if said sample material receives a heat energy, said retainer ring being situated between said finger members and said receptacle with said sample material sandwitched between it and the respective tips of said upwardly tapered members on said support of said receptacle.

13. An apparatus as claimed in claim 9, further comprising a substantially cylindrical partition panel supported above said partition plate and encircling said heating device.

14. An apparatus as claimed in claim 9, further comprising passage means for communicating the closed cell chamber to a source of cooling medium for, when said cooling medium is supplied into said closed cell chamber, cooling the sample material and exhaust passage means and a valve means, said exhaust passage means being communicated between said closed cell chamber and said valve means, said valve means being in turn communicated with the atmosphere and a source of vacuum, said valve means being adjustable to permit the closed cell chamber to communicate with the atmosphere when said cooling medium is supplied into said closed cell chamber and to permit the closed cell chamber to communicate with the vacuum source when the closed cell chamber is to be held under substantial vacuum.

15. An apparatus as claimed in claim 14, further comprising a removable inner enclosure similar in shape to said enclosure, said inner enclosure having an opening in alignment with said opening in said enclosure.

* * * * *